United States Patent [19]

Yamamatsu et al.

[11] 3,945,404
[45] Mar. 23, 1976

[54] MEAT CASING WITH INTERNAL RELEASE COATING

[75] Inventors: Kenichi Yamamatsu, Hisai; Shozo Yamada, Ichishi; Hiroaki Nouni, both of Mie; Shuzi Yokoyama, Hisai, all of Japan

[73] Assignee: Towa Kako Co., Ltd., Tokyo, Japan

[22] Filed: Mar. 1, 1974

[21] Appl. No.: 447,149

[30] Foreign Application Priority Data

July 20, 1973 Japan................ 48-80724

[52] U.S. Cl. ............. 138/118.1; 426/135; 426/811; 428/352
[51] Int. Cl.² .......................................... F16L 11/00
[58] Field of Search ........... 426/271, 278, 274, 135, 426/90, 811, 105, 302, 410; 260/438.5 C, 45.75 G, 2 M, 31.2 R, 31.4 R, 31.6, 32.8 R, 33.4 R; 138/118.1; 428/245, 248, 264

[56] References Cited
UNITED STATES PATENTS 2,549,220  4/1951  McLaren............... 260/438.5 C
3,653,928  4/1972  Rose .................... 426/135
3,802,953  4/1974  Marzocchi ............ 260/438.5 C FOREIGN PATENTS OR APPLICATIONS
970,494  9/1964  United Kingdom.......... 260/438.5 C Primary Examiner—Norman Yudkoff
Assistant Examiner—Hiram H. Bernstein
Attorney, Agent, or Firm—Hill, Gross, Simpson, Van Santen, Steadman, Chiara & Simpson

[57] ABSTRACT

A tubular casing for sausage, ham or like processed meat mass is coated internally with a water-soluble complex chromium compound with a view to improved peelability, among other purposes, of the casing from the meat mass encased therein. The complex chromium compound may first be diluted with water, with the pH of the resulting aqueous solution regulated as required by the addition of a slight amount of caustic soda or the like. The thus-prepared coating fluid is coated in a suitable fashion on the internal surface of the tubular meat casing, which may be either cellulosic or fibrous, and the coated casing is then dried as by hot drafts of air.

3 Claims, No Drawings

MEAT CASING WITH INTERNAL RELEASE COATING

BACKGROUND OF THE INVENTION

This invention relates generally to food casings and is directed more specifically to tubular meat casings coated internally with a material which permits ready and neat removal of the casings from the finished sausages, hams and like meat products encased therein.

As is well known, various foods are preserved by such physical methods as cooling or freezing, thermal processing, drying or dehydration, and treatment by ultraviolet rays or by radiation, or by such chemical methods as the use of chemical preservatives or sterilizers, or of acids or sugar, salting or pickling, and gas substitution. Additional methods of food preservation include the combination of salting and smoking, condensation, thermal seasoning, and pasting.

The food casings to which this invention is directed are intended for use with such preservable food products as sausages or hams which are produced by smoking treatment, or all the above listed methods of food preservation. The casings for sausages or the like are required to serve both as containers during the processing of the products and as protective wrappers for the finished products. In order to fulfill this dual objective, such meat casings are usually fabricated of regenerated cellulose or of fibers including fibrous webs and are provided in the form of tubes which may be creased or uncreased.

For the production of sausages or hams, the desired meat masses are stuffed into the tubular casings and are then smoked at elevated temperatures. The casings must, of course, be removed from the finished meat products prior to slicing. A special problem arises at this juncture in that since the meat masses stick or adhere to the inside surfaces of the casings during their smoking or heating treatment due for the most part to the presence of collagen therein, the casings cannot be peeled off the meat masses without at least parts of the meat masses coming off with the removed casings. This phenomenon greatly impairs the commercial value of such processed meat products.

Thus, in order to improve the "peelability" of the meat casings, it has been proposed to coat their inside surfaces with organosiloxanes or with the reaction product of epichlorohydrine and polyamide, as disclosed in U.S. Pat. Nos. 3,307,956 and 3,158,492, in Japanese Pat. Publication No. 47-11, and in the Japanese patent application laid open to public inspection as No. 48-8959. However, these resins are relatively expensive, and when any excess amounts of the resins are used, they can cause an undue decrease in the necessary permeability of the casings to smoke, moisture vapor, dyeing, and the like. The meat masses encased in this kind of casings cannot be subjected to the smoking treatment with any favorable results.

Another disadvantage of such prior art coatings resides in the fact that they tend to impart too much peelability to the casings. As a consequence, the casings treated with the prior art coating agents are likely to separate in places from the processed meat masses therein, and what are known in the trade as "jelly pockets" may be produced in such unoccupied spaces within the casings. The ultimate result may be the propagation of microorganisms or bacteria therein. It must also be taken into consideration that the aforesaid prior art coatings utilizing organosiloxanes and other resins must be cured at relatively high temperatures, possibly resulting in the impairment of the physical properties of the casings themselves.

SUMMARY OF THE INVENTION

In view of the listed deficiencies of the prior art, it is an object of this invention to provide a novel and improved food casing which duly adheres to the finished meat mass or the like encased therein but which is easily and thoroughly removable from the meat mass or the like.

Another object of the invention is to provide a coating agent to be coated on the inside surface of a meat casing to improve its peelability, such that the agent does not adversely affect the required permeability of the casing to smoke and the like, permits curing at relatively low temperatures, and is substantially less expensive than organosiloxanes and most of other coating compositions used conventionally.

A further object of the invention is to provide a coating agent which, unlike organosiloxanes, does not greatly affect the resulting peelability and other properties of the meat casing according to its amount coated over unit area of the casing surface, so that the coating operation of the casing can be highly expedited.

A still further object of the invention is to provide a coating agent which is effective to lend not only peelability but pliancy and wet strength to the meat casing.

According to this invention, water-soluble complex chromium compounds are employed as the agent to be coated on the inside surfaces of meat casings, which can be either fibrous or cellulosic in material. The advantages of the water-soluble complex chromium compounds over the prior art coating agents include the fact that they can be easily diluted with water and undergo polymerization at relatively low temperatures. Furthermore, the water-soluble complex chromium compounds favorably unite with the —OH group of the fibrous webs constituting the meat casings, and the compounds do not penetrate through the casings but remain firmly stuck onto their internal surfaces, thereby enhancing the peelability of the casings.

The features which are believed to be novel and characteristic of this invention are set forth with particularity in the appended claims. The invention itself, however, as well as the additional objects and advantages thereof, will become more apparent and understandable as the description proceeds hereinbelow in more specific aspects of the invention and in terms of some specific Examples thereof.

DETAILED DESCRIPTION OF THE INVENTION

In the practical application of this invention, the water-soluble complex chromium compounds for use as the coating agent may first be dissolved in water and, after being coated on the inside surfaces of desired food casings, are then heated for desiccation. The chemical changes of the complex chromium compounds involved in this sequence of operation will be apparent from the following formulas:

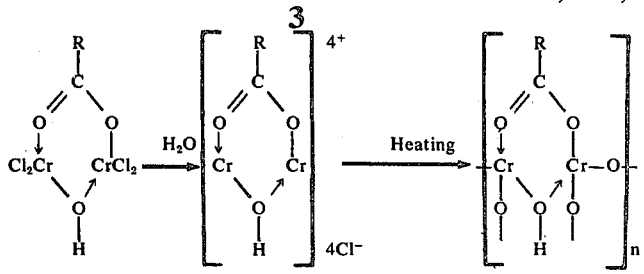

where R represents a fatty acid radical with 13 to 18 carbon atoms. Such water-soluble complex chromium compounds dissociate in their aqueous solution, and when heated succeedingly they polymerize while causing desorption of hydrogen chloride. Water-insoluble films can thus be formed which are firmly attached to the inside surfaces of the food casings, imparting peelability and pliancy thereto.

The alkyl radical in the above presented formula of the water-soluble complex chromium compounds according to the invention may be selected from straight-chain saturated fatty acids such as myristic acid, pentadecyclic acid, palmitic acid, heptadecyclic acid, stearic acid, and like higher fatty acids.

The invention is hereinafter described more specifically in terms of several Examples thereof which, however, are meant purely to illustrate or explain and not to impose limitations upon the invention.

EXAMPLE I

Zebran CR-N (a trade mark of a water-soluble complex chromium compound of Werner complex type manufactured by Ipposha Yushikogyo K.K., of Japan) was diluted with 20 times as much water, and a slight amount of caustic soda was then added by way of an alkaline catalyst to regulate the pH of the aqueous solution to 5.0. The thus-prepared coating fluid was then poured into and through a commercially available cellulosic meat casing of tubular shape with a length of 50 meters and a transverse dimension of 90 millimeters when in flat form. The excess coating fluid was squeezed off by passing the casing between a pair of squeeze rolls, and the casing was then dried by drafts of air at a temperature of about 60°C. The weight of the coating thus formed on the inside surface of the casing proved to be about 0.3 gram per square meter in solid form when measured on the basis of the amount of the fluid consumed. This meat casing is hereinafter referred to as the casing A.

By way of comparison a casing B was prepared by coating the epichlorohydrine-polyamide resin, which has water-soluble and thermosetting properties, on the inside surface of another cellulosic meat casing of the above specified dimensions in accordance with the teachings of Japanese Pat. No. 45-928. A casing C was likewise prepared by way of comparison by use of an organosiloxane as the coating agent as disclosed in Japanese Pat. No. 47-11.

The casings A, B and C were then each cut into a length of 50 centimeters, and after closing one end of each casing with a string, 1,000 grams of sausage emulsion was stuffed under pressure into each casing. The other ends of the casings were then similarly closed with strings. The casings thus filled with the sausage emulsion were placed in a smoking chamber of industrial dimensions, where they were subjected to smoking treatment for 1.5 hours at a temperature of 75°C. The smoked sausage emulsions were succeedingly steam boiled for 2 hours at a temperature of 75°C, were then cooled for 1 hour within a cooling device in accordance with the usual practice in the trade, and were then allowed to stand for 24 hours within a refrigerator.

The thus obtained sausage products were tested as to the presence of jelly pockets within the respective casings, the peelability of the casings from the sausages encased therein, and the smoking degree. The results are given in Table 1 below:

Table 1

|  | Casing A | Casing B | Casing C |
| --- | --- | --- | --- |
| Presence of Jelly Pockets | No | Yes | Yes |
| Peelability | Good | Slightly inferior |  |
| Smoking Degree | Excellent | Good | Poor |

It was practically to no avail to test the peelability of the casing C because it had not completely stuck to the sausage encased therein but had been separated therefrom in parts. The smoking degree of the respective products in the above tests was judged on the basis of the degree of coloring and flavor as a result of the smoking treatment.

EXAMPLE II

Zebran CR-N used in Example I was again diluted with 50 times as much water, and a slight amount of caustic soda was likewise added by way of an alkaline catalyst to regulate the pH of the aqueous solution to 4.5. In strict accordance with the procedure set forth in Example I, the thus prepared fluid was then coated and dried on the internal surface of a commercially available fibrous meat casing with a length of 50 meters and a transverse dimension of 108 millimeters when in flat form. The weight of the coating thus formed on the internal surface of the fibrous casing proved to be about 0.1 gram per square meter in solid form when measured on the basis of the amount of the coating fluid consumed. This casing is hereinafter referred to as the casing D.

A casing E was prepared by way of comparison by coating the epichlorohydrine-polyamide resin on the inside surface of another fibrous meat casing of the above specified dimensions in accordance with Japanese Pat. No. 45-928. A casing F was further prepared by use of an organosiloxane as the coating agent in accordance with Japanese Pat. No. 47-11.

The casings D, E and F were then each cut into a length of 50 centimeters, and after tying one end of each casing with a string, a meat block for use as a ham was introduced under pressure into each casing. The other end of each casing was then similarly tied and closed. The casings thus filled with the meat blocks were succeedingly subjected to the smoking and after-treatments in exact accordance with the procedure of Example I.

Also as in Example I, the resulting products were examined as to the presence of jelly pockets within the respective casings, the peelability of the casings from the finished hams encased herein, and the smoking degree. The results are given in Table 2 which follows:

Table 2

|  | Casing D | Casing E | Casing F |
|---|---|---|---|
| Presence of Jelly Pockets | No | No | Yes |
| Peelability | Excellent | Poor |  |
| Smoking Degree | Excellent | Good | Slightly inferior |

Like the casing C in Example I, the casing F could not be evaluated for peelability because it had not completely adhered to the ham enclosed therein.

It will be apparent from the foregoing data that both cellulosic and fibrous casings coated internally with the aqueous solution of the complex chromium compound of the Werner complex type according to the invention are superior in all respects. In the practical application of this invention, however, it is preferable that the water-soluble complex chromium compound be coated on the inside surfaces of the casings which have been just manufactured and are still in a moist state, by use of pairs of squeeze rolls in the known manner. The casings processed in this fashion will exhibit still better peelability than the casings coated internally after once having become thoroughly dry.

While this invention has been described hereinbefore in very specific aspects thereof, it will be easy for those skilled in the art to resort to a variety of modifications or changes on the basis of this disclosure, while still remaining within the spirit and scope of the invention as sought to be defined by the following claims.

What is claimed is:

1. A food casing having the inner surface thereof coated with a water-soluble chromium complex having the formula:

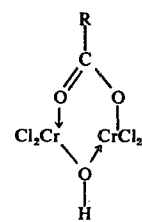

where R is an aliphatic radical with 13 to 18 carbon atoms, said compound being polymerizable by heat into a water-insoluble film.

2. A food casing as defined in claim 1, wherein R is selected from the class consisting of myristic acid, pentadecylic acid, palmitic acid, heptadecylic acid, and stearic acid.

3. A food casing in which the inner surface thereof is coated with a water-insoluble thermal polymerization product of a water-soluble chromium complex having the formula:

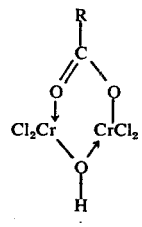

where R is an aliphatic radical containing from 13 to 18 carbon atoms.

* * * * *